United States Patent [19]
Izumi et al.

[11] Patent Number: 5,740,154
[45] Date of Patent: Apr. 14, 1998

US005740154A

[54] MAGNETOOPTICAL RECORD MEDIUM HAVING ADJACENT HEADER SIGNALS

[75] Inventors: Haruhiko Izumi; Masakazu Taguchi; Michio Matsuura; Yoshihide Fujita; Akihiro Itakura, all of Kawasaki, Japan

[73] Assignee: Fujitsu Limited, Kawasaki, Japan

[21] Appl. No.: 825,421

[22] Filed: Mar. 28, 1997

Related U.S. Application Data

[63] Continuation of Ser. No. 611,249, Mar. 5, 1996, abandoned.

[30] Foreign Application Priority Data

Aug. 17, 1995 [JP] Japan ..................... 7-209813

[51] Int. Cl.$^6$ ..................................................... G11B 7/24
[52] U.S. Cl. ................................................. 369/275.3
[58] Field of Search ..................... 369/13, 275.1–275.4, 369/44.26; 360/48

[56] References Cited

U.S. PATENT DOCUMENTS

| | | | |
|---|---|---|---|
| 5,084,860 | 1/1992 | Maeda et al. ................... | 369/275.3 |
| 5,270,998 | 12/1993 | Uchiumi ........................... | 369/275.1 |
| 5,383,176 | 1/1995 | Inui et al. ........................ | 369/275.4 |
| 5,422,874 | 6/1995 | Birukawa et al. ................ | 369/275.4 |
| 5,477,524 | 12/1995 | Deguchi et al. ................. | 369/275.3 |
| 5,517,485 | 5/1996 | Nishiuchi et al. ................ | 369/175.4 |

FOREIGN PATENT DOCUMENTS

| | | |
|---|---|---|
| 61-63930 | 4/1986 | Japan . |
| 5-282705 | 10/1993 | Japan . |
| 6-328846 | 12/1994 | Japan . |
| 7-307040 | 11/1995 | Japan . |

*Primary Examiner*—Nabil Hindi
*Attorney, Agent, or Firm*—Greer, Burns & Crain, Ltd.

[57] ABSTRACT

The sector formats of adjacent record tracks are made different from each other so that a region of an ID signal of a header part of one of the record tracks is adjacent to a region (VFO part) other than an ID signal of a header part of the other record track and the regions of ID signals are not adjacent to each other. A crosstalk component from the VFO part which is the closest pattern is so small that it little affects the reproduction of an ID signal. Therefore, an ID signal is correctly reproduced.

9 Claims, 13 Drawing Sheets

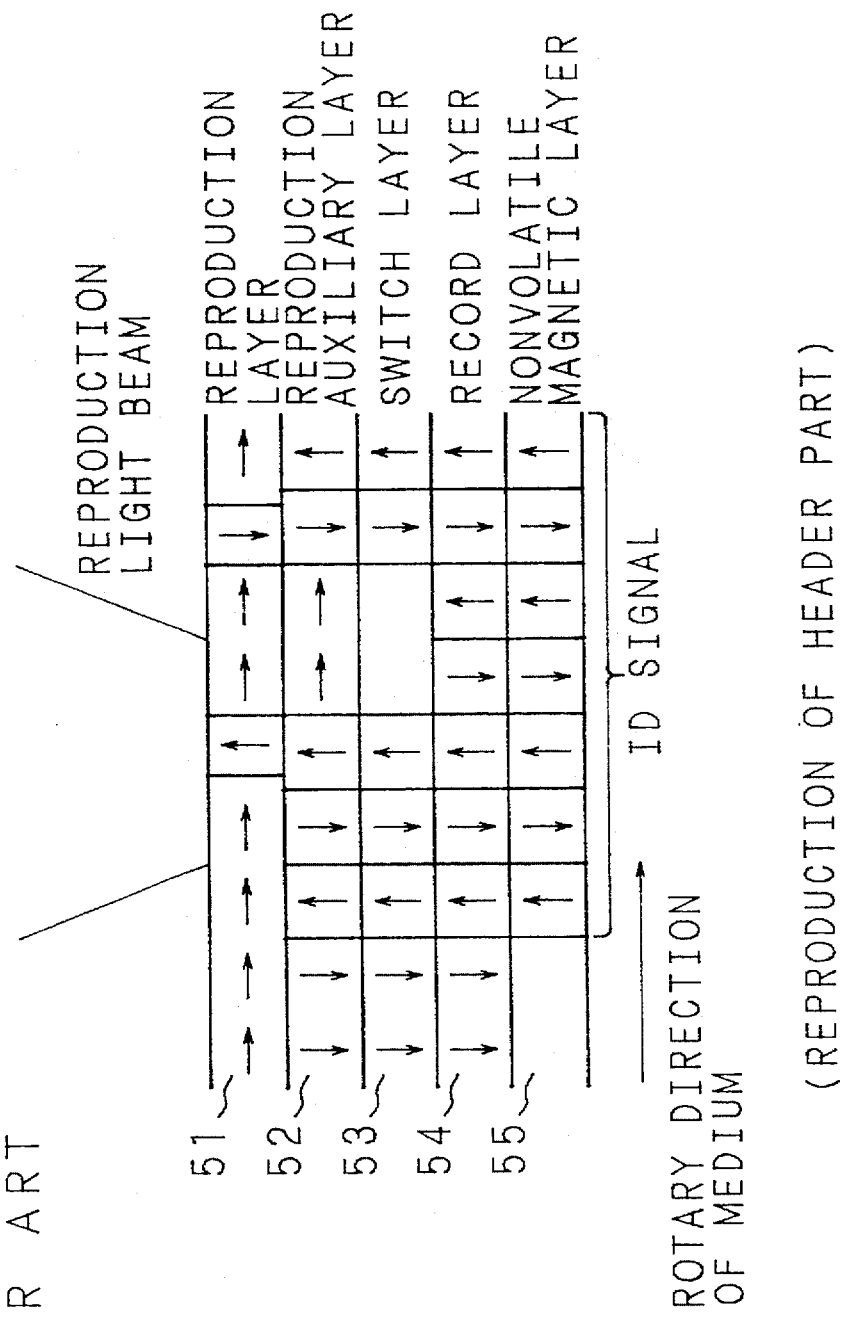

(REPRODUCTION OF DATA PART)

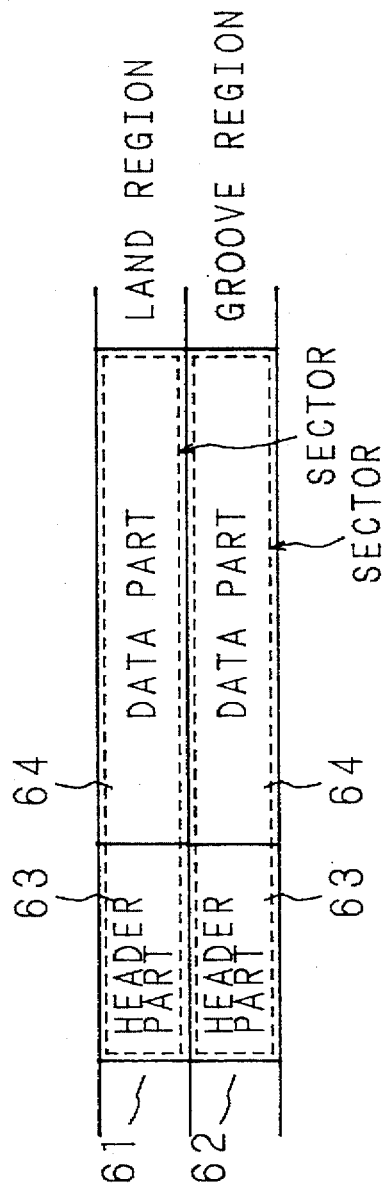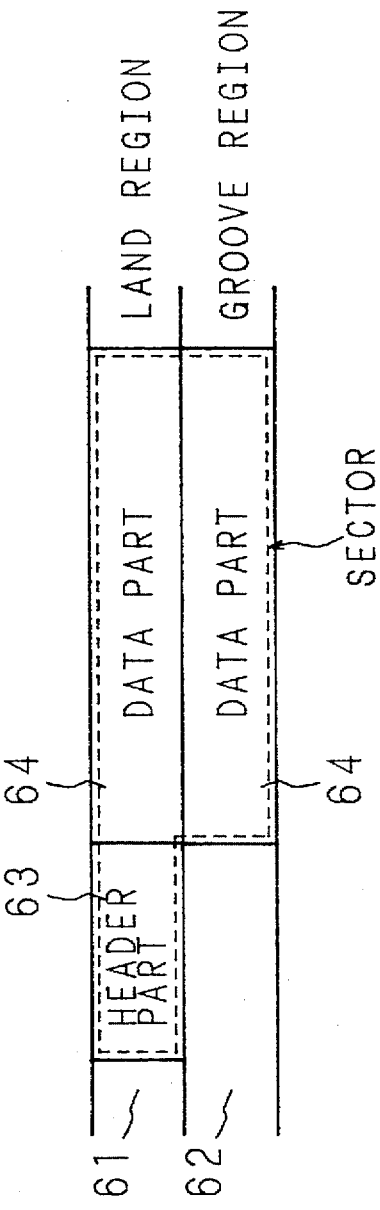
FIG. 2A PRIOR ART
FIG. 2B PRIOR ART

[SMALL INFLUENCE OF CROSSTALK]

[LARGE INFLUENCE OF CROSSTALK]

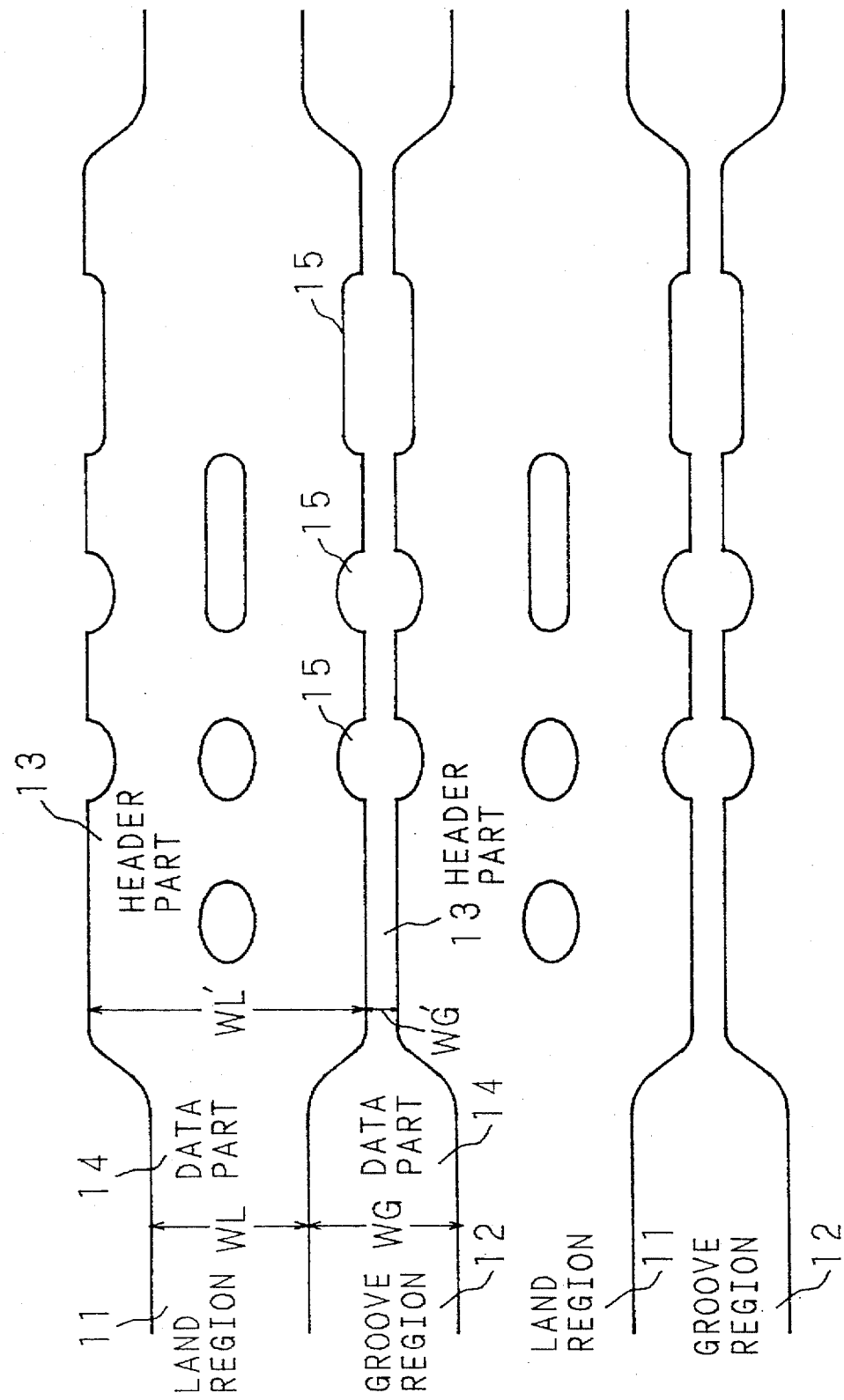

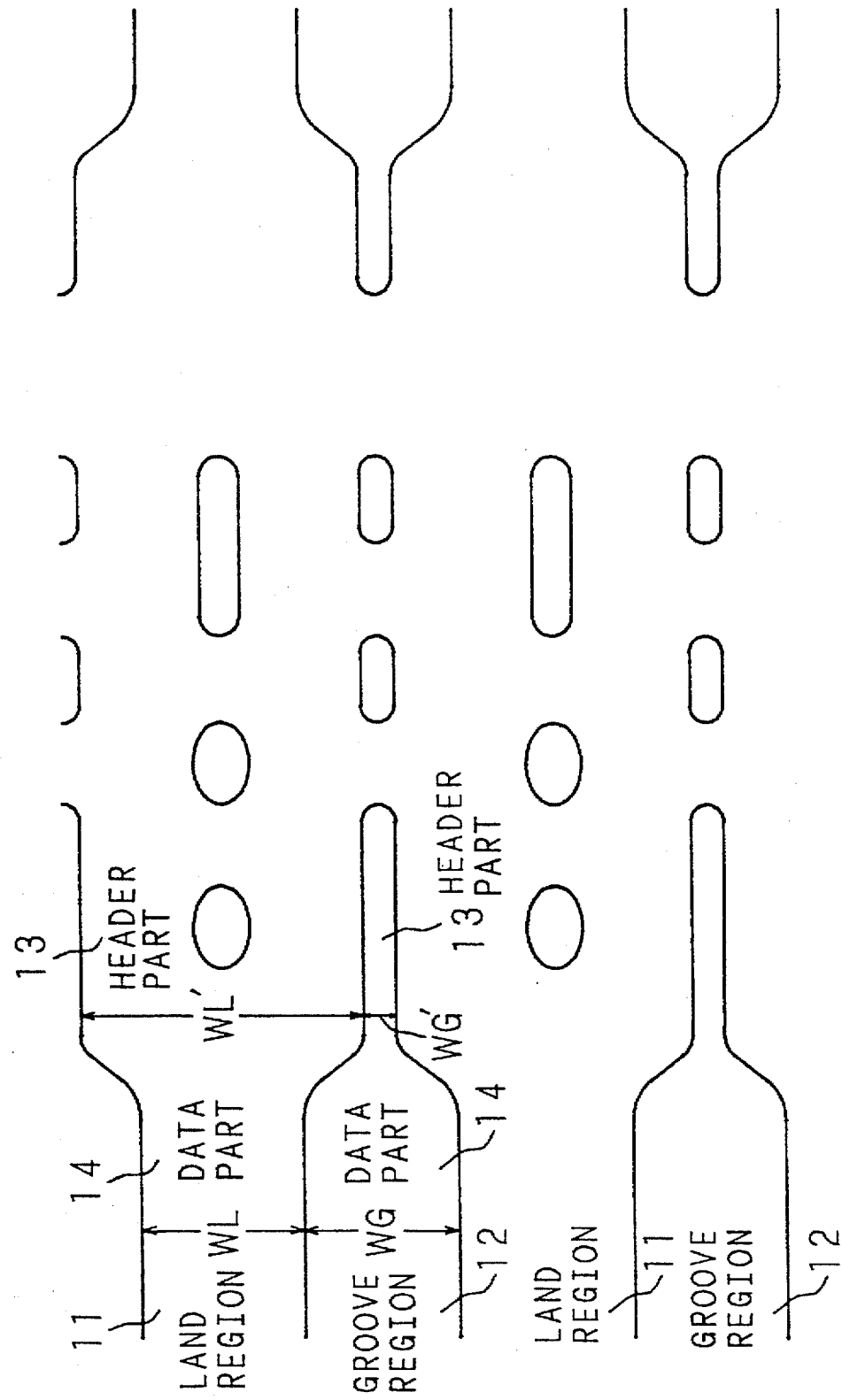

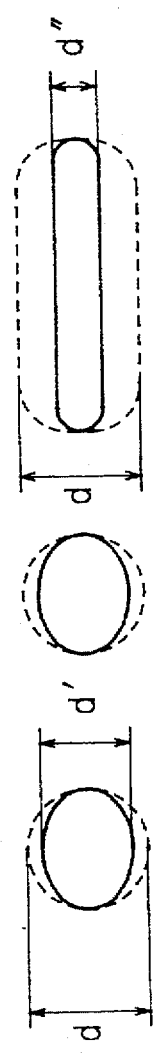
FIG. 12A  PIT SEQUENCE
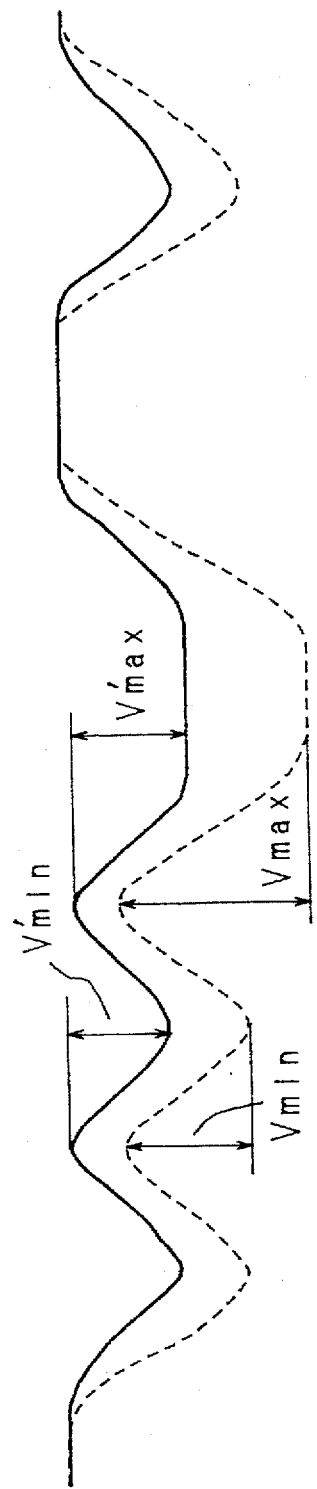
FIG. 12B  WAVEFORM OF REFLECTED LIGHT AMOUNT 5,740,154

MAGNETOOPTICAL RECORD MEDIUM HAVING ADJACENT HEADER SIGNALS

This application is a continuation of application Ser. No. 08/611,249 filed on Mar. 5, 1996 now abandoned.

BACKGROUND OF THE INVENTION

1. Field of the Invention

The invention relates to a magnetooptical record medium such as a magnetooptical disk, a magnetooptical tape, or a magnetooptical card.

2. Description of Related Art

Recently, as an external record medium of a computer system, a magnetooptical disk has attracted widespread attention. In a magnetooptical disk, record bits in a submicron order are formed on a medium by applying an external magnetic field and illumination of a laser beam, whereby the storage capacity can be remarkably increased as compared with a flexible disk or a hard disk which are external record media of the prior art. Consequently, a magnetooptical disk is positioned at the center of the field of memories for storing data which expand as rapid growth of multimedia, and demands for increasing the storage capacity of a magnetooptical disk are growing.

Under the circumstances, in order to improve the recording density, studies are conducted on practical use of the land/groove record/reproduction system. In this system, not only land regions in which record marks are conventionally recorded, but also groove regions, each of which is positioned between adjacent land regions and from which a tracking signal is obtained, are used as record regions so as to be used for recording and reproducing data. Since also the groove regions which are not conventionally used are used as record regions, the recording density of a magnetooptical disk is expected to be largely improved. However, this system has a problem in that a record mark formed in a land region is very close to that formed in a groove region so that, according to the wavelength (780 nm) of a laser beam which is currently used, crosstalk occurs between signals reproduced from adjacent record tracks, and reproduction cannot be correctly conducted.

On the other hand, a reproduction method using an MSR (Magnetically Induced Super Resolution) medium, in which a record mark smaller in size than a beam spot can be reproduced, is known. In the reproduction method, when a record mark in a beam spot is reproduced, other record marks are masked, thereby enhancing the reproduction resolution. This reproduction method may be applied to the so-called RAD (Rear Aperture Detection) type reproduction method wherein a record mark is read out from a high-temperature region while using a low-temperature region in a beam spot as a mask region. In this case, since data are read out from a high-temperature region, a record mark of an adjacent track is not transferred to a reproduction layer, thereby preventing the above-mentioned crosstalk from occurring. With respect to a signal due to a change in a reflected light amount from pits of a header part which is preformat-recorded, however, the magnetically induced super resolution effect cannot be attained so that crosstalk is inevitably caused. This produces a problem in that a header signal such as an ID signal which is recorded in a header part cannot be correctly reproduced.

When also a header signal including an ID signal of a header part is selfformat-recorded by means of magnetooptical recording in the same manner as a data signal of a data part, the problem of crosstalk is not produced. When a mal-operation of a magnetooptical record/reproduction apparatus or the like causes a header part to be illuminated with a laser beam of a recording power, however, data of the header signal are destroyed. Consequently, the above-mentioned countermeasure has a problem in that it cannot be practically used in the view point of reliability.

In order to deal with these problems, the inventors have proposed a novel magnetooptical record medium which can solve the problem of crosstalk and conduct the land/groove record (Japanese Patent Application Laid-Open No. 7-307040). The proposed magnetooptical record medium is configured by combining the configuration of an MSR medium with a nonvolatile record medium in which magnetooptical reproduction can be conducted. FIGS. 1A and 1B are diagrams showing the configuration of the magnetooptical record medium which has an MSR structure consisting of a reproduction layer 51, a reproduction auxiliary layer 52, a switch layer 53, and a record layer 54, and a nonvolatile magnetic layer 55 which is exchange-coupled or magnetostatic-coupled with the record layer 54.

A header signal including an ID signal is previously recorded in a header part by illumination of a laser beam of a high power which causes the temperature of the nonvolatile magnetic layer 55 to exceed the Curie temperature (or by reducing the circumferential speed so as to be lower than the normal one). The nonvolatile magnetic layer 55 of a data part following the header part is held to the as-deposition state (the state which is obtained immediately after the production or in which none of initialization, record, and erasure has been conducted or the state in which magnetizations are not aligned in a specific direction). According to this configuration, even when the header part is illuminated with a laser beam of a low power which is sufficient for recording and erasing in a usual magnetooptical record/reproduction apparatus, the ID signal recorded in the nonvolatile magnetic layer 55 is not destroyed and the ID signal is transferred to the record layer 54 by means of exchange-coupling or magnetostatic-coupling during the process wherein the temperature is lowered. Therefore, the ID signal is prevented from being erased or rewritten. When the ID signal is once transferred to the record layer 54, the ID signal is enabled to be reproduced by the mask effect in accordance with the principle of the above-mentioned magnetically induced super resolution, and the problem of crosstalk can be solved.

In a record/reproduction method using the magnetooptical record medium described above, a header signal is previously recorded by a nonvolatile record system which can be subjected to magnetooptical reproduction and the header signal is then reproduced by using the magnetically induced super resolution effect, thereby solving the problem of crosstalk. Since the nonvolatile recording is done, the reliability is ensured.

In the record/reproduction method, the sector format is formed as shown in FIG. 2A. In each of a land region 61 and a groove region 62, one sector (the region enclosed by a broken line) which functions as a record unit is configured by a header part 63 and a data part 64 following the header part.

The above-described magnetooptical record medium is excellent because it can solve the problem of crosstalk and accurately conduct the land/groove record/reproduction. However, a header signal including an ID signal is not preformat-recorded so that it is not recorded in the production of a medium, and hence a header signal must be recorded in each sector after the medium is produced. This requires a prolonged period for formatting the medium. Consequently, the medium has a problem of mass production which remains to be solved.

In view of the above, the inventors have proposed a magnetooptical record medium in which a header signal can be preformat-recorded and the problem of crosstalk can be solved (Japanese Patent Application No. 6-328846). The magnetooptical record medium has a sector format shown in FIG. 2B. As shown in FIG. 2B, one sector (the region enclosed by a broken line) is configured by combining a land region 61 with a groove region 62 which is adjacent to the land region 61, a header part 63 is formed in only one of the land region 61 and the groove region 62 (in the example shown in FIG. 2B, in the land region 61 only), and a data part 64 following the header part 63 is distributed to the land region 61 and the groove region 62. Even when the header signal of the header part 63 is preformat-recorded, therefore, the problem of crosstalk does not occur.

In the magnetooptical record medium proposed in Japanese Patent Application No. 6-328846, since one sector is distributed to a land region and a groove region, a two-beam optical head is required for record or reproduction. In order to realize a two-beam optical head, it is necessary to use two laser diodes functioning as a light source or a laser diode having two laser emitting cavities. This produces a manufacturing problem in that the production cost of such an optical head is higher than that of a usual one-beam optical head.

Although the magnetically induced super resolution effect is attained in a data part, the effect is not attained in a preformatted signal of a header part and hence the resolution is low. As a result, there arises a problem in that, when the linear density is the same, the resolution of a reproduced waveform of a header part is different from that of a data part.

SUMMARY OF THE INVENTION

It is an object of the invention to provide a magnetooptical record medium in which the reproduction of an ID signal of a header part is prevented from being affected by crosstalk.

It is another object of the invention to provide a magnetooptical record medium in which a header part can be preformatted and which is excellent in mass productivity.

It is a further object of the invention to provide a magnetooptical record medium in which, even when a header part is preformatted, the resolution of a preformatted signal of the header part can be made equal to that of a magnetooptical signal of a data part.

In the magnetooptical record medium of the invention, an ID signal of a track is not adjacent to that of a track adjacent thereto. Therefore, the influence of crosstalk is reduced so that, even when the land/groove record is conducted, a header part can be preformatted. Accordingly, the medium is suitable for mass production.

The above and further objects and features of the invention will more fully be apparent from the following detailed description with accompanying drawings.

BRIEF DESCRIPTION OF THE DRAWINGS

FIGS. 1A and 1B are diagrams showing the configuration of a prior art magnetically induced super resolution medium in which a ROM-record can be done;

FIGS. 2A and 2B are sector-format diagrams of prior art magnetooptical record media;

FIG. 10 is a diagram showing an example of a preformat of a header part in the invention;

FIG. 11 is a diagram showing another example of a preformat of a header part in the invention;

FIG. 12A is a diagram showing shapes of preformatted pits in the invention; and

FIG. 12B is a diagram showing a waveform of a reflected light amount of a preformat in the invention.

DESCRIPTION OF THE PREFERRED EMBODIMENTS

Figure 3:
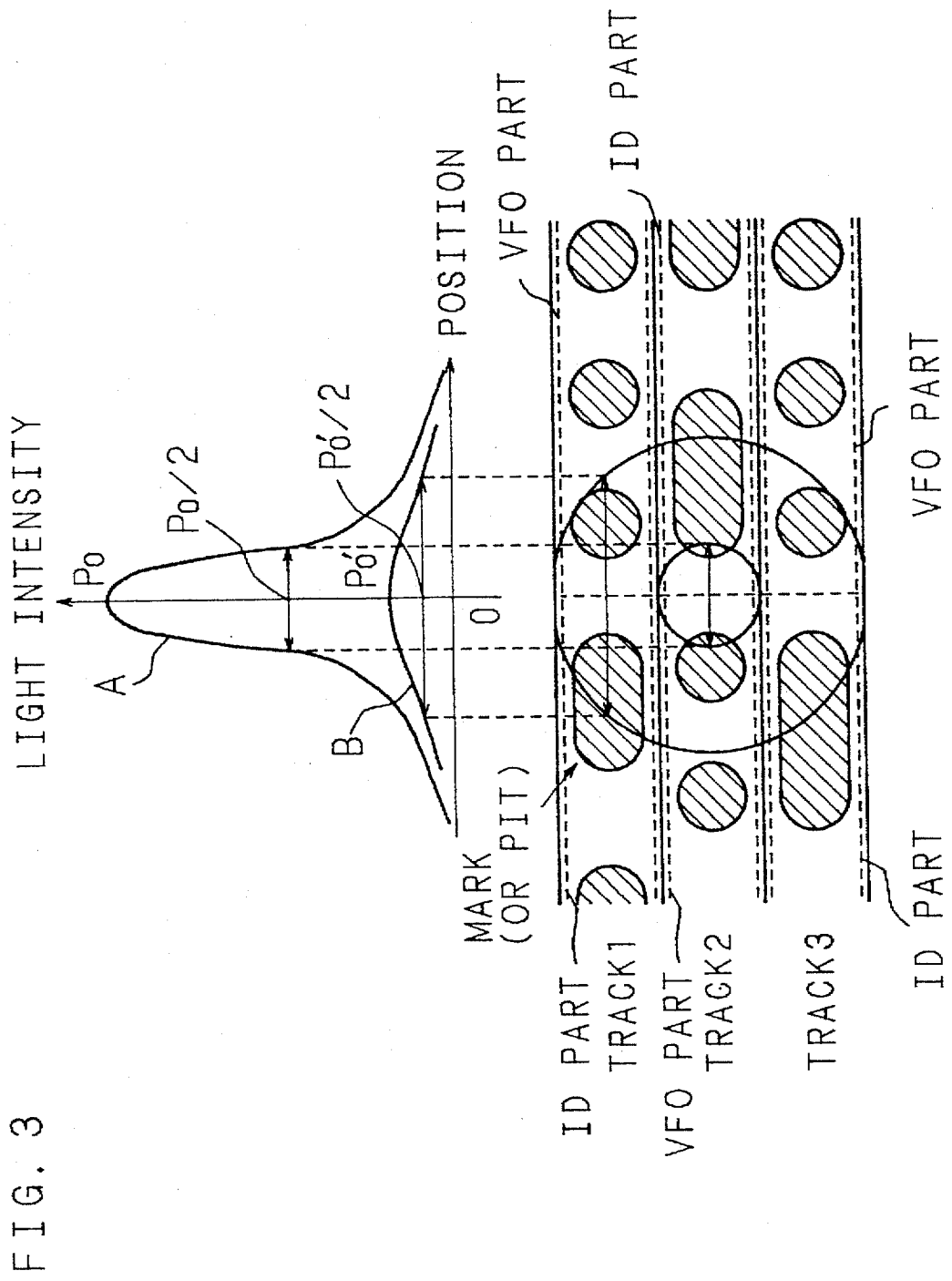
FIG. 3 is a diagram showing a record pattern of a header part and the light intensity in reproduction according to the invention.
Figure 4A:
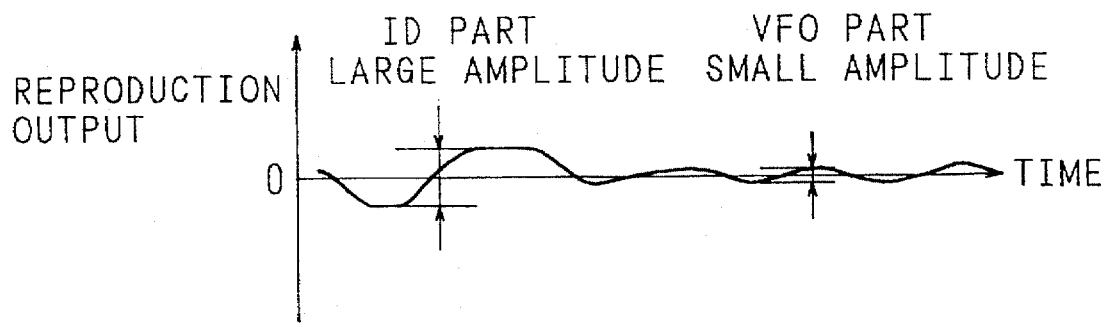
FIGS. 4A, 4B, and 4C are diagrams showing reproduction outputs according to the invention.
Figure 4B:
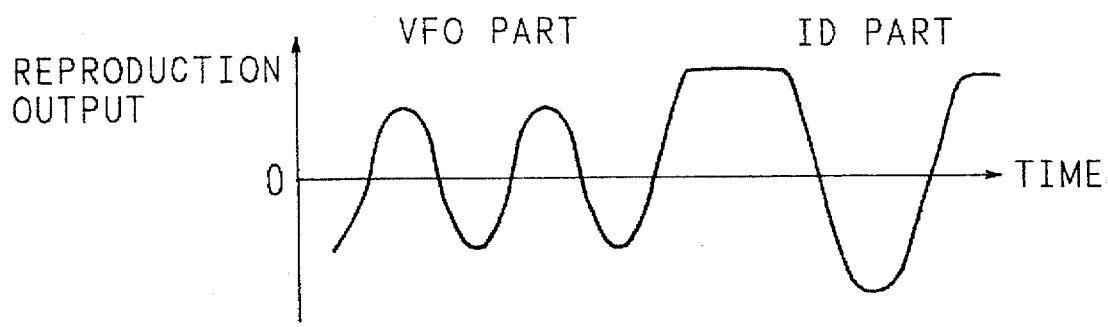
Figure 4C:
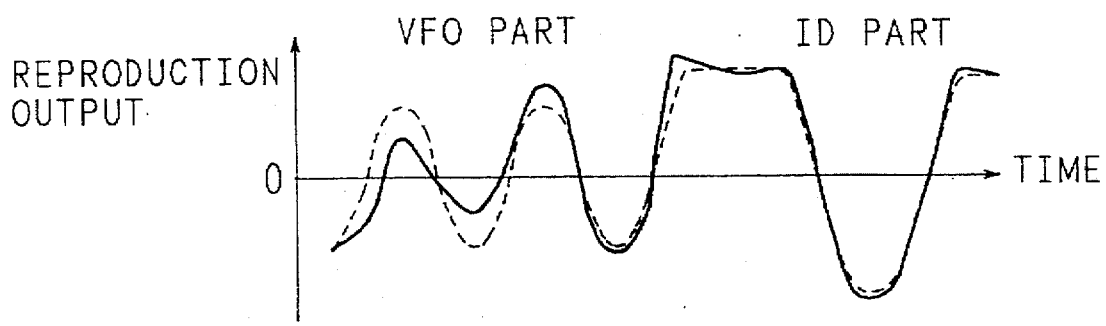
Figure 5:
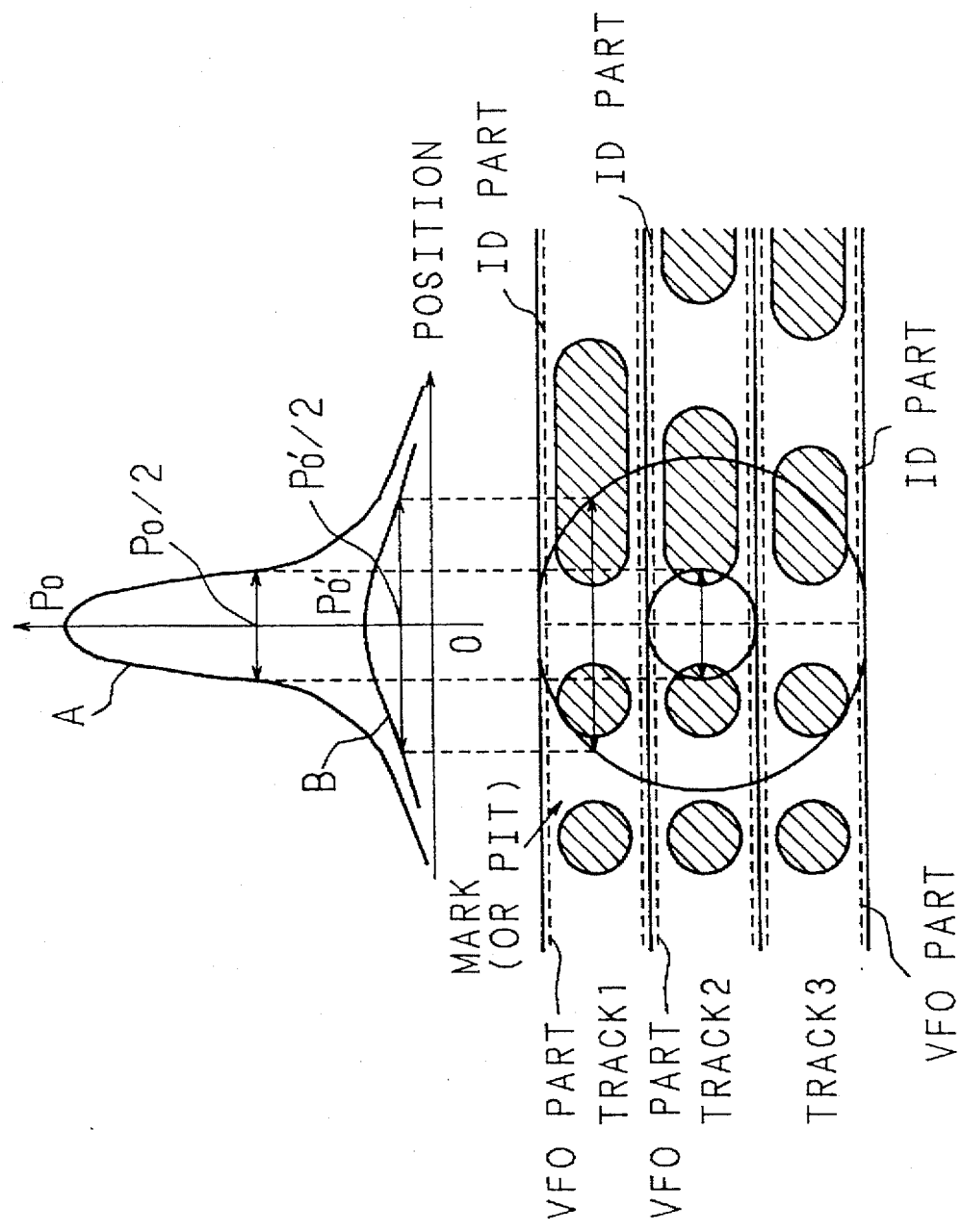
FIG. 5 is a diagram showing a record pattern of a header part and the light intensity in reproduction in a prior art example.
Figure 6A:
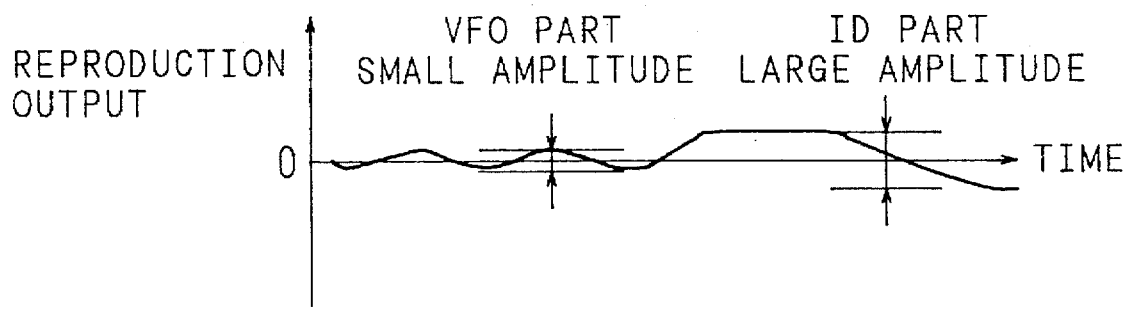
FIGS. 6A, 6B, and 6C are diagrams showing reproduction outputs in the prior art example.
Figure 6B:
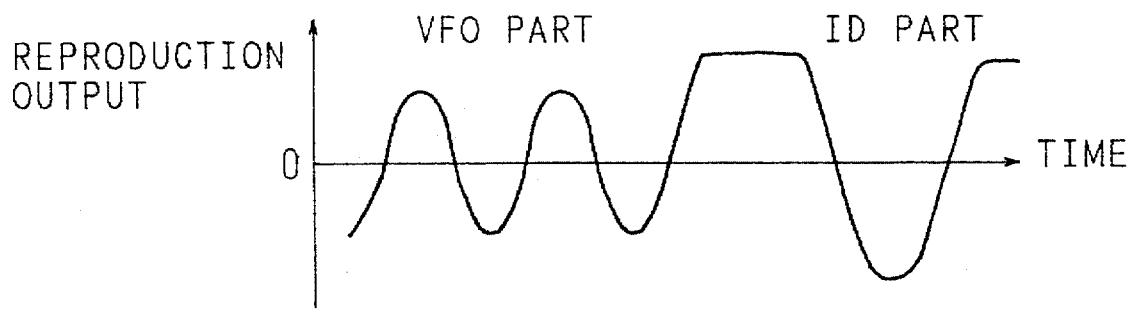
Figure 6C:
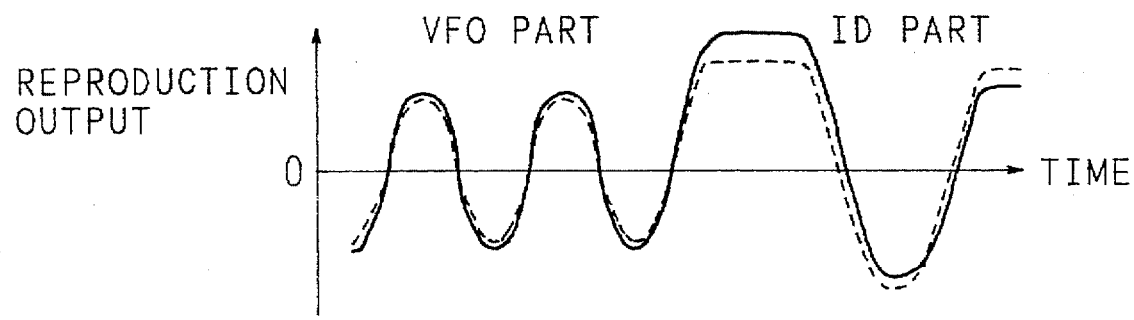

FIGS. 3, and 4A–4C are diagrams illustrating the principle of the invention. FIG. 3 is a diagram showing a record pattern of a header part and the light intensity in reproduction according to the invention, and FIGS. 4A–4C are diagrams showing reproduction outputs according to the invention. FIGS. 5, and 6A–6C are diagrams showing a prior art example which is used as a comparison example for illustrating the invention. FIG. 5 is a diagram showing a record pattern of a header part and the light intensity in reproduction in the prior art example, and FIGS. 6A–6C are diagrams showing reproduction outputs in the prior art example.

In both the example of the invention and the prior art example, a header part is preformat-recorded. In the prior art example, as shown in FIG. 5, a region where an ID signal which is a sector management signal is recorded (hereinafter, such a region is referred to as "ID part"), and a region where data of the closest pattern and for generating a synchronous clock signal are recorded (hereinafter, such a region is referred to as "VFO part") are located at the same positions in all of the tracks, and, with respect to two adjacent tracks, ID parts are adjacent to each other and VFO parts are adjacent to each other. By contrast, in the example of the invention as shown in FIG. 3, an ID part and a VFO part of one track are positionally shifted from those of an adjacent track or an ID part of one track is adjacent to a VFO part of a track adjacent to the one track. In other words, ID parts of adjacent tracks are shifted from each other in the track direction so as not be adjacent to each other, and the ID part of either of the tracks is adjacent to the VFO part of the other track.

In each of FIGS. 3 and 5, the medium is illuminated with a laser beam and a reproduction light spot centered at center track 2 is formed at present. The light intensity distribution of the light spot of the laser beam has at its center portion a steep light intensity pattern which has a large peak value as indicated by A of FIGS. 3 and 5, and at its peripheral portion a gentle light intensity pattern which has a small peak value as indicated by B of FIGS. 3 and 5.

Consequently, the resolution of the center portion is higher than that of the peripheral portion. Since the component of crosstalk due to an adjacent track is caused by the widespread bottom of the intensity distribution of a reproduction light spot, the resolution of the crosstalk component is lower than that of the original signal component. As a data pattern is shorter, therefore, the crosstalk level is lower.

The data pattern formed in a VFO part usually consists of a simple repetition of the closest patterns and does not include a long pattern. The closest patterns of a VFO part produce crosstalk of a lowest level and hence little affect on the reproduction of an ID signal. On the other hand, since a VFO part is used only for generating a synchronous clock signal and is not reproduced as data, the length of each data is not required to be correctly equal to that of the closest pattern. Even when crosstalk is caused in the part by an ID signal, there arises no problem.

The above-described influences of crosstalk are shown in FIGS. 4A–4C (the example of the invention) and FIGS. 6A–6C (the prior art example). FIGS. 4A and 6A show crosstalk components (a reproduction output from track 1 or 3) due to the peripheral portions of the light spots of FIGS. 3 and 5, FIGS. 4B and 6B show the original signal components (a reproduction output from track 2) due to the center portions of the light spots of FIGS. 3 and 5, and FIGS. 4C and 6C show reproduction outputs (solid lines) which are obtained by superimposing the crosstalk components (FIGS. 4A and 6A) on the original signal components (FIGS. 4B and 6B). In FIGS. 4C and 6C, the original signal components shown in FIGS. 4B and 6B are indicated by broken lines.

In the prior art example wherein ID parts of adjacent track are adjacent to each other, when an ID part of track 2 is to be reproduced, as shown in FIGS. 6A–6C, the crosstalk components from ID parts of adjacent tracks 1 and 3 have a large level so that the ID signal recorded in track 2 cannot be correctly read out. By contrast, in the example of the invention wherein the ID part of a track is adjacent to the closest-pattern VFO part of an adjacent track, when the ID part of track 2 is to be reproduced, as shown in FIGS. 4A–4C, the crosstalk components from the VFO parts of adjacent tracks 1 and 3 have a small level so that the ID signal recorded in track 2 can be correctly read out without being affected by the crosstalk. In the example of the invention, when the VFO part of track 2 is to be reproduced, the reproduction is affected by the relatively-large crosstalk components from the ID parts of adjacent tracks 1 and 3. Since the VFO part is not reproduced as data, there arises no problem even when crosstalk is caused by the ID signal during the reproduction of the VFO part.

According to the invention, therefore, the influence of crosstalk can be reduced and a header signal of the head of a sector can be preformat-recorded without using a two-beam optical head. It is a matter of course that, even when a header signal is not preformat-recorded, crosstalk can be similarly reduced in the reproduction of an ID part.

The record format of a header part according to the invention can be applied not only to a magnetooptical record medium in which the pitch of record tracks is so narrow that an influence of crosstalk causes a serious problem, but also to a magnetooptical record medium of the land/groove system which is intended to improve the recording density. In the latter case, in a land region and a groove region which are adjacent to each other, the ID part of a header part of one of the regions is not adjacent to that of the other region, the ID part of the land region is adjacent to the VFO part of the groove region, and the ID part of the groove region is adjacent to the VFO part of the land region. Also in this case, it is a matter of course that, even when a header signal is not preformat-recorded, crosstalk can be similarly reduced in the reproduction of an ID part.

In a magnetooptical record medium of the land/groove system to which the record format of a header part according to the invention is applied, a header signal is preformat-recorded, the groove width of a header part of a sector of a groove region is smaller than that of a data part, and the header signal is formed by prepits having a width larger than the groove width or by an interruption of grooves. According to this configuration, the pit width in a groove region can be made smaller and crosstalk can be further reduced.

In the magnetooptical record medium of the invention, the width of prepits for a header signal is determined in accordance with the length of a data pattern. Specifically, when a data pattern is long, the prepit width is made smaller, and, when a data pattern is short, the prepit width is made larger. According to this configuration, the resolution of a header signal which is preformat-recorded in a header part can be made equal to that of a magnetooptical signal which is magnetooptically recorded in a data part.

Hereinafter, a specific embodiment of the invention will be described.

Figure 7:
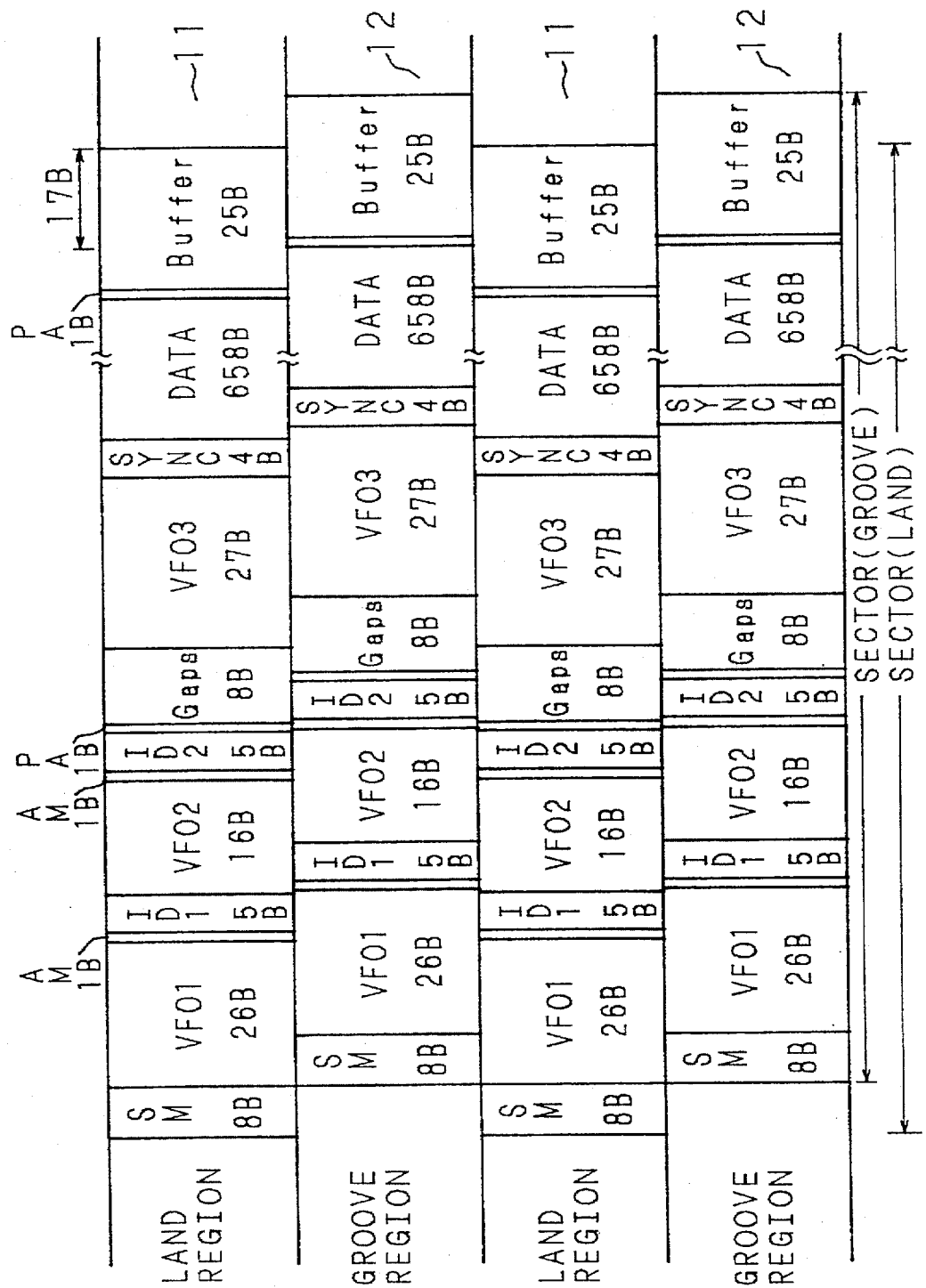
FIG. 7 is a diagram showing an example of a sector format in the invention.

FIG. 7 is a diagram showing an example of a sector format of a magnetooptical record medium of the land/groove record system according to the invention.

In the format example of the invention shown in FIG. 7, sectors having the same format consisting of a header part and a data part are formed in land regions 11 and groove regions 12. The sectors in the land regions 11 are positionally shifted from those in the groove regions 12 by 8 bits, respectively. Therefore, all of an 8-bit sector mark (SM) which is positioned at the head of a header signal and indicates the beginning of a sector, a 5-bit identification (ID) which indicates sector management information, and a 1-bit address mark (AM) which indicates that an ID is recorded at the succeeding position are adjacent to a VFO1 part or a VFO2 part.

Figure 1B:
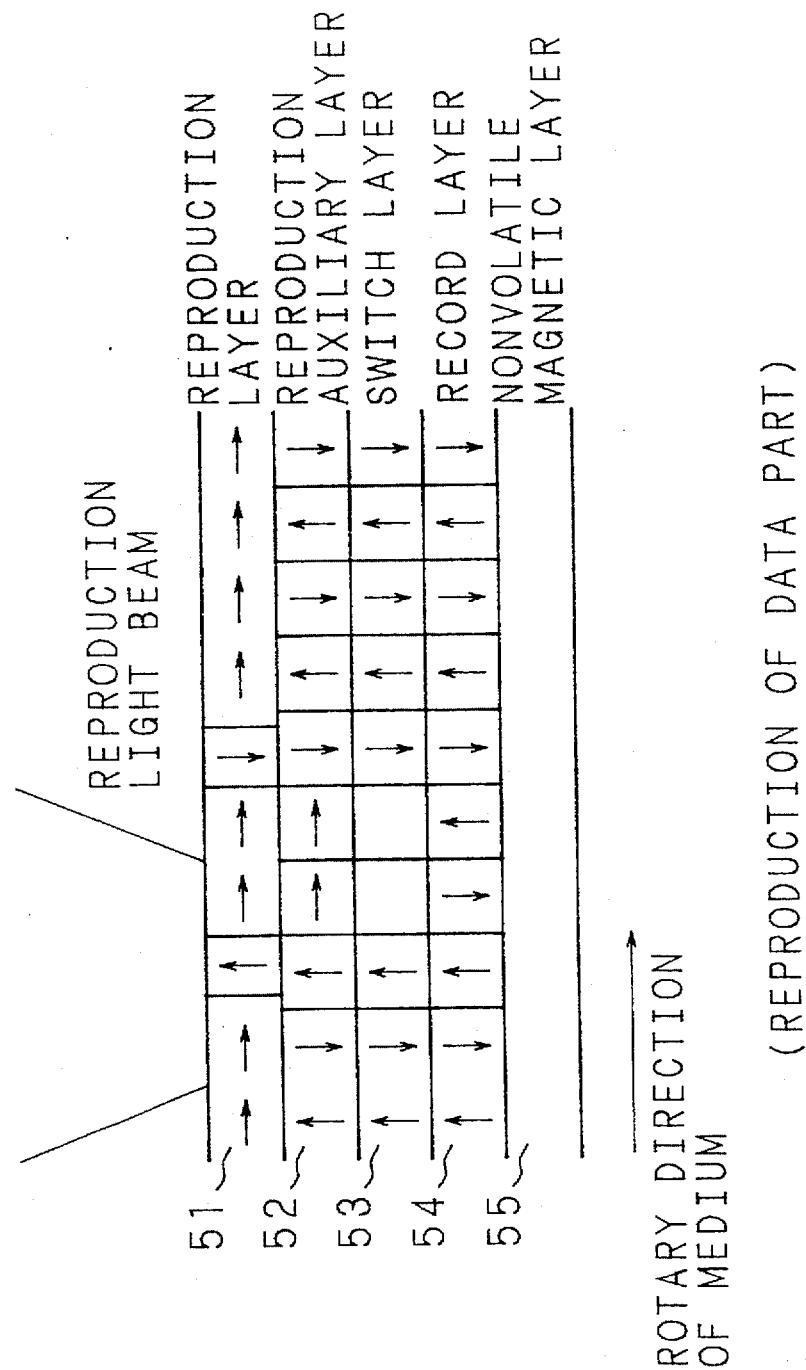

In the embodiment, in order to compensate deviation of recording positions due to the variation in revolution number or the eccentricity of the medium, the buffer data positioned at the rear end of a sector are configured by 17 bits. Each buffer region (Buffer) consists of 25 bits so that, even when the sectors of the land regions 11 and the groove regions 12 are positionally shifted, buffer data of 17 bits are ensured between headers of adjacent tracks. The record film for magnetooptical recording in each data part has the configuration of the MSR medium shown in FIGS. 1A and 1B.

Figure 8:
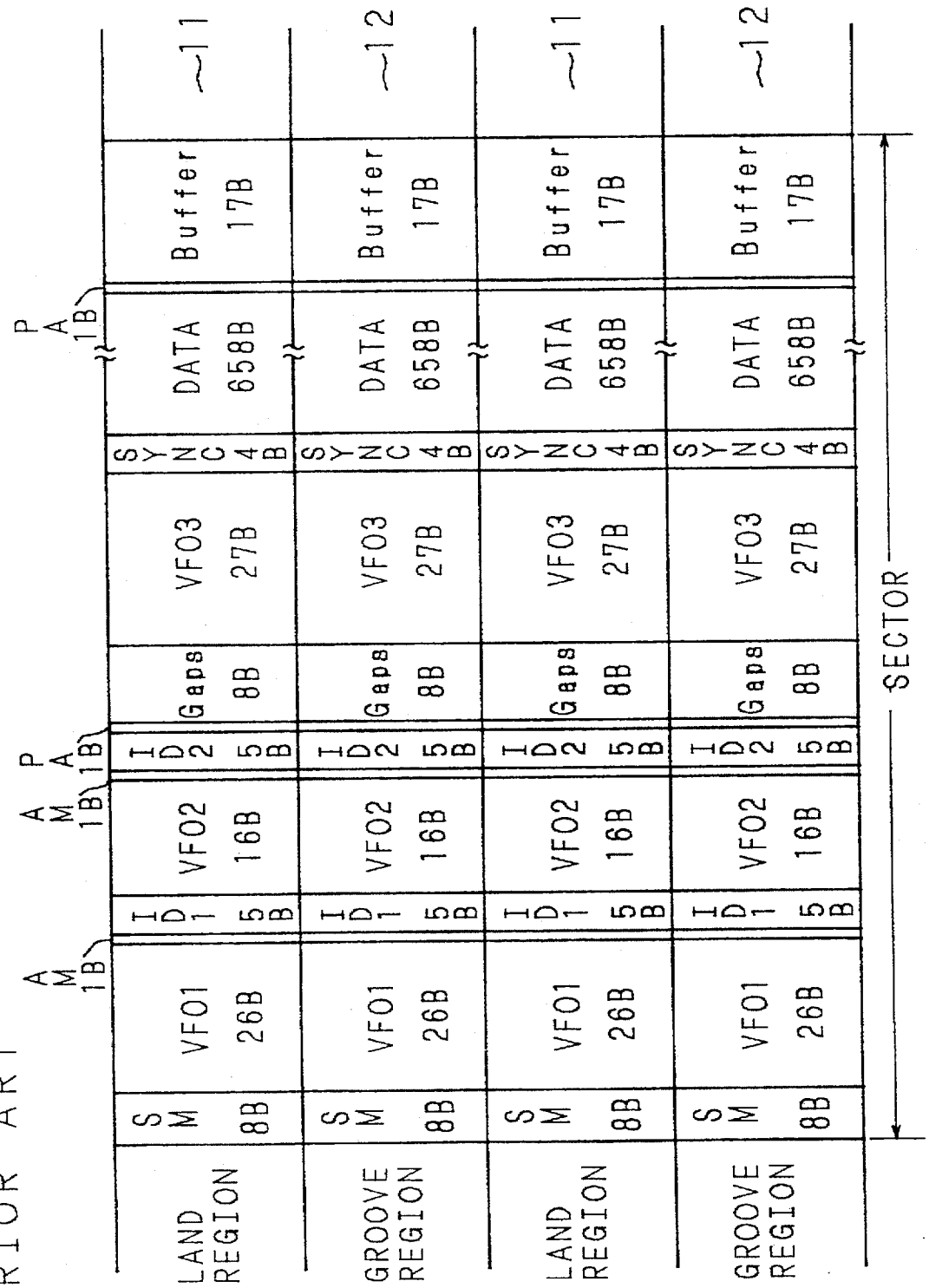
FIG. 8 is a diagram showing a sector format in the prior art.

FIG. 8 is a diagram showing an example of a sector format in the prior art. In the prior art example of a sector format shown in FIG. 8, sectors of the land regions 11 are positioned and configured in the strictly same manner as those of the groove regions 12. Therefore, an ID of the land regions 11 is adjacent to that of the groove regions 12, with the result that the influence of crosstalk is large.

By contrast, in the sector format of the invention shown in FIG. 7, the portion for an ID signal of a header signal of the land regions 11 is not adjacent to that of the groove regions 12, and any ID signal is adjacent to a VFO part consisting of a simple repetition of the closest patterns. As described above, the crosstalk component is smaller as a data pattern is shorter, and therefore crosstalk to an ID signal is caused only by the closest patterns and very small so as not to substantially affect the reproduction of the ID signal. As a result, ID signals in the land regions 11 and the groove regions 12 can be correctly reproduced.

The VFO parts are affected by crosstalk due to the ID signals. As described above, however, the VFO parts are used only for generating the synchronous clock signal and are not reproduced as data. Even when the reproduction output is disturbed due to crosstalk, therefore, there arises no serious problem. In the reproduction of an ID signal which must be correctly reproduced, therefore, the influence of crosstalk can be reduced so that a header part can be preformat-recorded without using a two-beam optical head. As described above, it is a matter of course that, even when a header signal is not preformat-recorded, crosstalk can be similarly reduced in the reproduction of an ID part.

Figure 9:
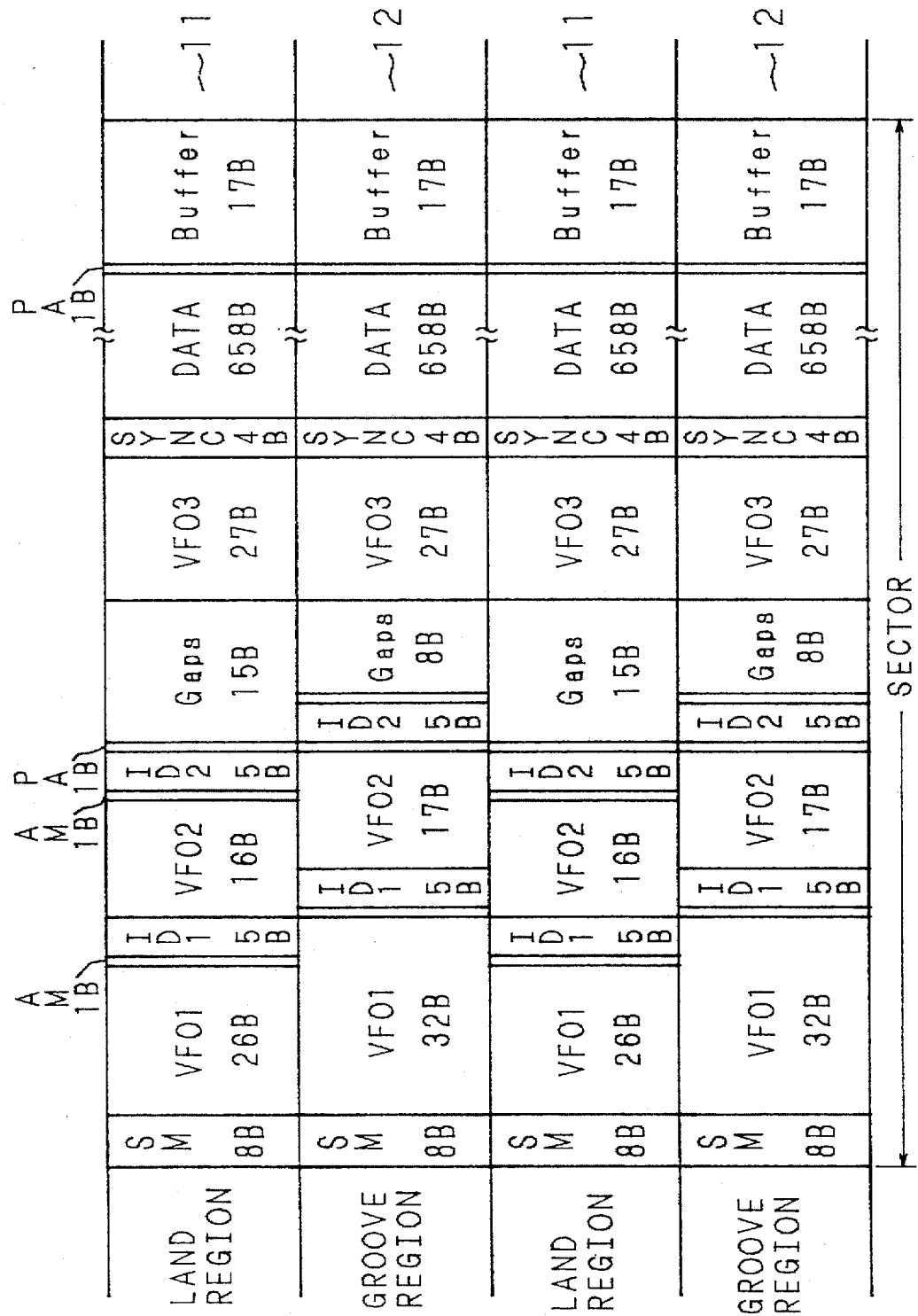
FIG. 9 is a diagram showing another example of a sector format in the invention.

FIG. 9 is a diagram showing another example of a sector format of a magnetooptical record medium of the land/groove record system according to the invention. In the example shown in FIG. 7, the sectors of the land regions 11 are positionally shifted from those of the groove regions 12, whereby the ID signal portions of both the regions are caused to be adjacent at both the sides to VFO parts. In the example shown in FIG. 9, the lengths (the numbers of bits) of the VFO1 and VFO2 parts of each sector of the land regions 11 are made different from those of the groove regions 12, whereby the ID signal portions of both the regions are caused to be adjacent at both the sides to VFO parts. In this example, each sector mark (SM) is adjacent at both the sides to other sector marks. Since all the sector marks have the same signal, there arises no problem even when crosstalk occurs.

FIG. 10 is a diagram showing an example of a preformat of a header part of the magnetooptical record medium of the invention. According to the example, in each of the groove regions 12, the groove width of a preformat-recorded header part 13 of each sector is smaller than that of a data part 14, and a header signal is formed by prepits 15 having a width which is larger than the groove width.

In the data part 14, the width WL of the land region 11 is substantially equal to the width WG of the groove region 12. In the header part 13 where preformat signals are formed, the width WG' of the groove region 12 is smaller than the width WL' of the land region 11. Specifically, when WL=WG=0.7 μm, it is preferable to set WL' to be 1.0 to 0.9 μm and WG' to be 0.4 to 0.5 μm. In this configuration, the signal strength due to the pits of the land region 11 and the groove region 12 can be ensured and crosstalk can be suppressed.

FIG. 11 is a diagram showing another example of a preformat of a header Dart of the magnetooptical record medium of the invention. According to the example, in each of the groove regions 12, the groove width of the header part 13 of each sector is smaller than that of the data part 14, and a header signal is formed by an interruption of grooves. Also in the example, in the same manner as the example shown in FIG. 10, the signal strength due to the pits of the land region 11 and the groove region 12 can be ensured and crosstalk can be suppressed.

Next, an example will be described in which the prepit width of a header signal is adjusted in accordance with the length of a data pattern. FIG. 12A shows a preformatted pit sequence, and FIG. 12B shows a waveform of a reflected light amount of the pit sequence. When all the long and short data patterns are formed so as to have the same pit width d as indicated by the broken lines of FIG. 12A, the reflected light amount obtained in the case where the data patterns are reproduced by means of a light spot is as indicated by the broken line of FIG. 12B. For a preformatted signal in which the magnetically induced super resolution effect cannot be attained at a linear density which is so high that the reproduction of a data part uses the magnetically induced super resolution effect, a waveform in which the ratio of Vmin/Vmax is small is produced or the resolution is impaired.

By contrast, when the pit width d" of a long data pattern is smaller than the pit width d' of a short data pattern as indicated by the solid lines of FIG. 12A, the reflected light amount obtained in the case where the data patterns are reproduced by means of a light spot is as indicated by the solid line of FIG. 12B. The ratio of Vmin'/Vmax' is equal to that of the data part which uses the magnetically induced super resolution effect in the reproduction. Therefore, the resolution of a preformatted signal of a header part can be made equal to that of a magnetooptical signal of a data part.

According to this configuration, the amplitude of a waveform is small, but there arises no particular serious problem because a signal reproduced from pits has a large amplitude and an excellent quality as compared with a waveform which is magnetooptically reproduced. Alternatively, not only the pit width but also the pit length may be changed in accordance with the length of a data pattern. In the alternative, it is possible to obtain a reproduced waveform having further excellent accuracy.

As described above, according to the example of the invention, the ID signal portion of a header signal of each sector of the land regions 11 is prevented from being adjacent to that of each sector of the groove regions 12. Therefore, the influence of crosstalk in the reproduction of an ID signal can be reduced so that, even when a header part is preformat-recorded, an ID signal can be correctly reproduced.

In the above, the magnetooptical record medium of the land/groove record system in which record and reproduction can be conducted on both the land regions 11 and the groove regions 12 has been described. Of course, the invention is not restricted to this and may be applied to a usual magnetooptical record medium having a plurality of record tracks. Particularly, the application of the invention to a magnetooptical record medium in which the pitch of record tracks is small and the reproduction is adversely affected by crosstalk is very effective.

As the record carrier of a data part, a record film having the magnetically induced super resolution effect is used. The part is not restricted to an MSR medium. As described above, even when a header part is not preformat-recorded, crosstalk in the reproduction of an ID signal can be reduced. Since the prepit width of a header part is adjusted in accordance with the length of a data pattern, the resolution of a header part can be made equal to that of a data part even when a data part is subjected to a high resolution reproduction using the magnetically induced super resolution. This is advantageous in the view point of a practical use.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magnetooptical record medium comprising:
   a plurality of adjacent record tracks;
   header signals each having an ID signal portion for identifying a data sector recorded in said plurality of adjacent record tracks;

ID signal portions of said header signals of one of said plurality of adjacent record tracks being aligned with non-ID signal portions of said header signals of another of said plurality of adjacent record tracks.

2. The magnetooptical record medium according to claim 1, wherein said header signals of said data sector are preformat-recorded, and a prepit of said header signals has a width or a length according to a data pattern.

3. The magnetooptical record medium according to claim 1, wherein said ID signal portions are adjacent to a VFO part of said header signals, said VFO part being used for generating a synchronous clock signal.

4. A magnetooptical record medium comprising:

a land region;

a groove region adjacent said land region, said land region and said groove region functioning as record tracks so as to record and reproduce data;

header signals each having ID signal portions for identifying data sectors recorded in said land region and said groove region, wherein, said header signals of said land region and said groove region are arranged so that said ID signal portions of said header signals recorded in said land region are adjacent another portion of said header signals recorded in said groove region, and said ID signal portions of said header signal recorded in said groove region is adjacent another portion of said header signals recorded in said land region.

5. The magnetooptical record medium according to claim 4, wherein, in said data sectors of said groove region, said header signals are preformat-recorded and a width of a region where said header signals are recorded is smaller than a width of a region where data are recorded.

6. The magnetooptical record medium according to claim 5, wherein said header signals of said sectors of said groove region are formed by a prepit having a width which is larger than a width of said groove region.

7. The magnetooptical record medium according to claim 5, wherein said header signals of said sectors of said groove region are formed by an interruption of grooves.

8. The magnetooptical record medium according to claim 4, wherein said header signals of said sectors are preformat-recorded, and a prepit of said header signals has a width or a length according to a data pattern.

9. The magnetooptical record medium according to claim 4, wherein the ID signal portions are adjacent a VFO part of said header signals, said VFO part being used for generating a synchronous clock signal.

* * * * *